(12) United States Patent
Hwang et al.

(10) Patent No.: US 11,904,657 B2
(45) Date of Patent: Feb. 20, 2024

(54) HEAT EXCHANGE SYSTEM FOR VEHICLE

(71) Applicant: Hanon Systems, Daejeon (KR)

(72) Inventors: In-Guk Hwang, Daejeon (KR); Sung Je Lee, Daejeon (KR)

(73) Assignee: Hanon Systems, Daejeon (KR)

( * ) Notice: Subject to any disclaimer, the term of this patent is extended or adjusted under 35 U.S.C. 154(b) by 701 days.

(21) Appl. No.: 17/050,728

(22) PCT Filed: Mar. 27, 2019

(86) PCT No.: PCT/KR2019/003580
§ 371 (c)(1),
(2) Date: Oct. 26, 2020

(87) PCT Pub. No.: WO2019/208942
PCT Pub. Date: Oct. 31, 2019

(65) Prior Publication Data
US 2021/0237537 A1  Aug. 5, 2021

(30) Foreign Application Priority Data

Apr. 27, 2018 (KR) .................. 10-2018-0049016

(51) Int. Cl.
*B60H 1/14* (2006.01)
*B60H 1/32* (2006.01)
*B60H 1/00* (2006.01)

(52) U.S. Cl.
CPC ........... *B60H 1/14* (2013.01); *B60H 1/00278* (2013.01); *B60H 1/00885* (2013.01);
(Continued)

(58) Field of Classification Search
CPC .... B60H 1/14; B60H 1/3228; B60H 1/00278; B60H 1/00899; B60H 1/32284;
(Continued)

(56) References Cited

U.S. PATENT DOCUMENTS 9,650,940 B2 * 5/2017 Kakehashi ............... B60K 6/22
2009/0260377 A1 * 10/2009 Miller ................. B60H 1/32281
62/434

(Continued)

FOREIGN PATENT DOCUMENTS

DE         69915615 T2 *  5/1999  ........... B60H 1/3204
DE      102009043316 A1 *  3/2011  ......... B60H 1/00278
(Continued)

*Primary Examiner* — Steven B McAllister
*Assistant Examiner* — Daniel E. Namay
(74) *Attorney, Agent, or Firm* — Norton Rose Fulbright US LLP; James R. Crawford

(57) ABSTRACT

A heat exchange system for a vehicle includes a refrigerant circulation loop for circulating a refrigerant, a compressor, a condenser, a first expansion valve, a second expansion valve, a first chiller and a second chiller. The first expansion valve and the first chiller form a group and the second expansion valve and the second chiller form another group. The two groups are arranged in parallel; a first coolant circulation loop comprising a first cooler, and circulating coolant which exchanges heat with the refrigerant via the first chiller; a second coolant circulation loop includes a second cooler, and circulating coolant which exchanges heat with the refrigerant via the second chiller. The first expansion valve and the second expansion valve are controlled so that the refrigerant passing through the first chiller during a cooling mode has a higher pressure, temperature, and rate of discharge than the refrigerant passing through the second chiller.

13 Claims, 8 Drawing Sheets

(52) U.S. Cl.
CPC ......... B60H 1/00899 (2013.01); B60H 1/143 (2013.01); B60H 1/3205 (2013.01); B60H 1/3228 (2019.05); B60H 1/32284 (2019.05); *B60H 2001/00307* (2013.01); *B60H 2001/00928* (2013.01)

(58) Field of Classification Search
CPC .... B60H 1/00885; B60H 1/004; B60H 1/143; B60H 1/3205; B60H 2001/00307; B60H 2001/00928
USPC ....................................... 237/12.3 B, 12.3 R
IPC ........................................ B60H 1/00,1/14, 1/32
See application file for complete search history.

(56) References Cited

U.S. PATENT DOCUMENTS

| | | | |
|---|---|---|---|
| 2010/0186440 A1* | 7/2010 | Hong | B60H 1/005 |
| | | | 62/434 |
| 2010/0205990 A1* | 8/2010 | French | B60P 3/14 |
| | | | 237/28 |
| 2016/0107507 A1 | 4/2016 | Johnston | |
| 2016/0153343 A1* | 6/2016 | Kakehashi | B60H 1/3228 |
| | | | 123/41.31 |
| 2017/0087957 A1 | 3/2017 | Blatchley et al. | |
| 2020/0353796 A1* | 11/2020 | Oh | B60H 1/143 |
| 2020/0369108 A1* | 11/2020 | Kim | B60H 1/00007 |

FOREIGN PATENT DOCUMENTS

| | | | | |
|---|---|---|---|---|
| JP | 2014181594 A | * | 9/2014 | ......... B60H 1/00278 |
| JP | 6139047 B2 | | 5/2017 | |
| KR | 101566318 B1 | * | 12/2012 | |
| KR | 101566318 B1 | | 11/2015 | |
| KR | 20170108447 A | * | 3/2016 | |
| KR | 20170012619 A | | 2/2017 | |
| KR | 20170013437 A | | 2/2017 | |
| KR | 20170108447 A | | 9/2017 | |
| KR | 20180008953 A | | 1/2018 | |
| WO | WO-2013175710 A1 | * | 11/2013 | ......... B60H 1/00271 |

* cited by examiner

< COOLING MODE >

< HEATING MODE >

< HEATING MODE >

< HEATING MODE >

HEAT EXCHANGE SYSTEM FOR VEHICLE

This application is a national phase under 35 U.S.C. § 371 of International Application No. PCT/KR2019/003580 filed Mar. 27, 2019, which claims the benefit of priority from Korean Patent Application No. 10-2018-0049016 filed on Apr. 27, 2018. The entire contents of these applications are incorporated herein by reference in their entirety.

TECHNICAL FIELD

The present invention relates to a heat exchange system for a vehicle that cools the interior of the vehicle by using a primary cooling loop using a refrigerant and a secondary cooling loop using a coolant.

BACKGROUND ART

In general, among the cooling systems that cool the interior of a vehicle, there is a direct cooling system in which a condenser, an expansion valve, an evaporator, and a compressor are connected in one loop to circulate a refrigerant and an evaporator is installed in the interior of the vehicle to cool the interior of the vehicle.

In addition, as illustrated in FIG. 1, there is a secondary loop cooling system including a primary cooling loop 10 in which a compressor 1, a condenser 2, an expansion valve 3, and a chiller 4 are connected in one loop to circulate and cool a refrigerant; and a secondary cooling loop 20 in which a coolant pump 5, a cooler 6, and the chiller 4 are connected in another loop and a coolant is circulated and heat-exchanged with the refrigerant in the chiller 4 to cool the coolant, and cooling the interior of the vehicle by using the cooler 6 on the secondary cooling loop 20 side.

However, since the secondary loop cooling system as described above has lower cooling performance than the direct cooling system, and is a system that cools the interior of the vehicle by cooling the coolant firstly by using the refrigerant rather than directly cooling air by using the refrigerant and cooling the air secondly using such coolant, it is disadvantageous in terms of cooling efficiency.

Here, in order to lower a temperature of the air cooled by the cooler using the secondary loop cooling system, a temperature of the coolant introduced into the cooler should be made as low as possible, and to this end, the temperature of the refrigerant passing through the chiller should be low, and the expansion valve should be adjusted to lower the temperature of the refrigerant.

However, when the expansion valve is adjusted to lower the temperature of the refrigerant, a flow rate of the refrigerant decreases, and as a result, the cooling performance of the secondary loop cooling system is not improved.

RELATED ART DOCUMENT

Patent Document

JP 6139047 B2 (2017.05.12)

DISCLOSURE

Technical Problem

An object of the present invention is to provide a heat exchange system for a vehicle with improved cooling performance compared to a technology for cooling the interior of the vehicle by using a conventional secondary loop cooling system.

In addition, an object of the present invention is to provide a heat exchange system for a vehicle in which a cooling mode for cooling the interior of the vehicle and a heating mode for heating the interior of the vehicle may be switched by using a secondary loop cooling system and efficiently used.

Technical Solution

In one general aspect, a heat exchange system for a vehicle includes: a refrigerant circulation loop L1 including a compressor 100, a condenser 200, a first expansion valve 310, a second expansion valve 320, a first chiller 410, and a second chiller 420 and having a refrigerant circulating therethrough, wherein the first expansion valve 310 and the first chiller 410 form a set and the second expansion valve 320 and the second chiller 420 form another set so that the two sets are disposed in parallel; a first coolant circulation loop L2-1 including a first cooler 610 and circulating a coolant heat-exchanged with the refrigerant through the first chiller 410; and a second coolant circulation loop L2-2 including a second cooler 620 and circulating a coolant heat-exchanged with the refrigerant through the second chiller 420.

In a cooling mode, the first expansion valve 310 and the second expansion valve 320 may be adjusted so that the refrigerant passing through the first chiller 410 has a higher pressure and temperature and has a higher flow rate than the refrigerant passing through the second chiller 420.

Air cooled firstly through the first cooler 610 may be secondarily cooled through the second cooler 620 and then used to cool the interior of the vehicle.

The heat exchange system for a vehicle may further include a third coolant circulation loop L2-3 including a radiator 110 and circulating a coolant heat-exchanged with the refrigerant through the condenser 200.

The third coolant circulation loop L2-3 may be connected to the second coolant circulation loop L2-2 by a first four-way valve 711 and a second four-way valve 712, in a cooling mode, a flow of coolant between the third coolant circulation loop L2-3 and the second coolant circulation loop L2-2 may be blocked, and in a heating mode, the first four-way valve 711 and the second four-way valve 712 may be adjusted so that a flow of coolant circulating in the condenser 200 and the second cooler 620 and a flow of coolant circulating in the radiator 110 and the second chiller 420 are formed, respectively.

The heat exchange system for a vehicle may further include a coolant heater 710 installed on a coolant line of the second coolant circulation loop L2-2 to heat the coolant.

The heat exchange system for a vehicle may further include a third expansion valve 330 installed on a refrigerant line of the refrigerant circulation loop L1 to distribute and adjust a flow rate of the refrigerant flowing toward the first expansion valve 310 and the second expansion valve 320.

The heat exchange system for a vehicle may further include a battery 800 installed on a coolant line of the first coolant circulation loop L2-1 and cooled by the coolant.

The heat exchange system for a vehicle may further include a battery 800 installed on a coolant line of the first coolant circulation loop L2-1 and an electrical component 900 installed on a coolant line of the third coolant circulation loop L2-3, wherein in the cooling mode, the battery 800 and the electrical component 900 may be cooled through the coolant, and in the heating mode, waste heat of the battery 800 and the electrical component 900 may be recovered through the coolant and used for heating the interior of the vehicle.

In the cooling mode, air cooled firstly through the first cooler 610 may be secondarily cooled through the second cooler 620 and then used for cooling the interior of the vehicle, and in the heating mode, the air may be heated through only the second cooler 620 without passing through the first cooler 610, and then used for heating the interior of the vehicle.

The heat exchange system for a vehicle may further include a bypass line 112 installed on the coolant line of the third coolant circulation loop L2-3, disposed in parallel with the radiator 110, and adjusting a flow rate of the coolant passing through the radiator 110.

The heat exchange system for a vehicle may further include a first coolant pump 510 installed on a coolant line of the first coolant circulation loop L2-1 to circulate the coolant and a second coolant pump 520 installed on a coolant line of the second coolant circulation loop L2-2 to circulate the coolant.

The heat exchange system for a vehicle may further include a third coolant pump 530 installed on a coolant line of the third coolant circulation loop L2-3 to circulate the coolant.

Advantageous Effects

The heat exchange system for a vehicle according to the present invention has an advantage in that cooling performance is improved compared to a cooling system that cools the interior of the vehicle by using a conventional secondary loop cooling system.

In addition, the heat exchange system for a vehicle according to the present invention has an advantage in that a cooling mode for cooling the interior of the vehicle and a heating mode for heating the interior of the vehicle may be switched by using the secondary loop cooling system and used.

BEST MODE

Hereinafter, a heat exchange system for a vehicle according to the present invention having the configuration as described above will be described in detail with reference to the accompanying drawings.

First Embodiment

Figure 1:
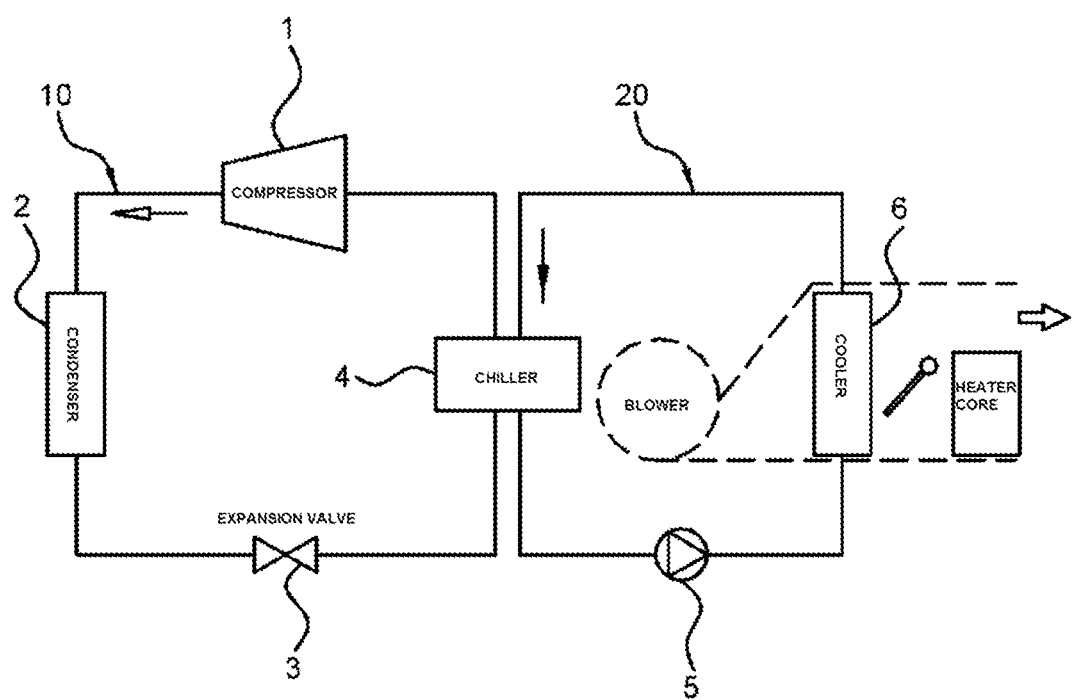
FIG. 1 is a conceptual diagram illustrating a conventional secondary loop cooling system.
Figure 2:
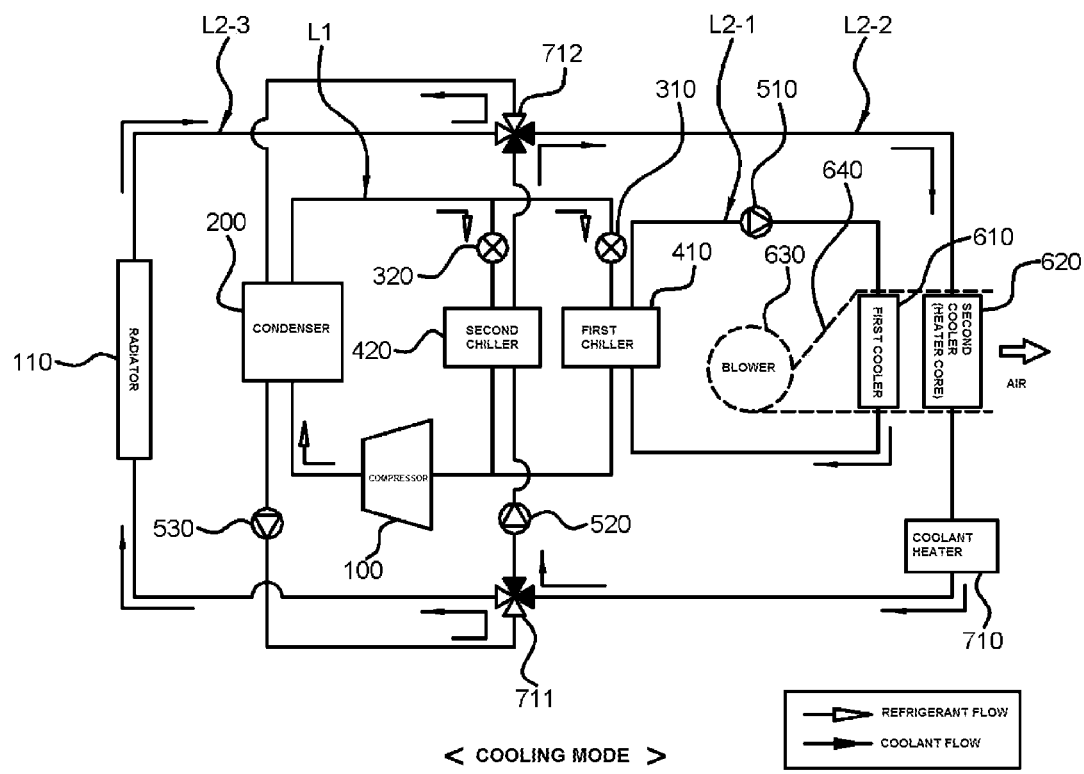
FIG. 2 is a configuration diagram illustrating a cooling mode of a heat exchange system for a vehicle according to a first embodiment of the present invention.

FIG. 2 is a configuration diagram illustrating a cooling mode of a heat exchange system for a vehicle according to a first embodiment of the present invention.

As illustrated, a heat exchange system for a vehicle according to a first embodiment of the present invention may generally include a refrigerant circulation loop L1 through which refrigerant is circulated, and a first coolant circulation loop L2-1 and a second coolant circulation loop L2-2 through which coolant is circulated.

The refrigerant circulation loop L1 includes a compressor 100, a condenser 200, a first expansion valve 310, a second expansion valve 320, a first chiller 410 and a second chiller 420, the first expansion valve 310 and the first chiller 410 form a set, and the second expansion valve 320 and the second chiller 420 form another set, so that the two sets may be disposed in parallel. In addition, in the refrigerant circulation loop L1, the compressor 100, the condenser 200, the first expansion valve 310, the second expansion valve 320, the first chiller 410, and the second chiller 420 may be connected by a refrigerant line.

Here, the compressor 100 may be driven by receiving power from a motor or engine that is a power supply source, and serves to suck and compress a low-temperature and low-pressure gaseous refrigerant to form a high-temperature and high-pressure gaseous state to be transferred to the condenser 200.

As the condenser 200, a water-cooled condenser may be used as an example, and the condenser 200 serves to heat-exchange the high-temperature and high-pressure gaseous refrigerant discharged from the compressor 100 with the coolant to condense the gaseous refrigerant into a low-temperature and high-pressure liquid, and transfer the liquid toward the first expansion valve 310 and the second expansion valve 320.

The first expansion valve 310 and the second expansion valve 320 are configured in parallel, and serve to rapidly expand the low-temperature and high-pressure liquid refrigerant discharged from the condenser 200 by using a throttling action to form a low-temperature and low-pressure wet saturation state to be transferred to the first chiller 410 and the second chiller 420, respectively. Here, the first expansion valve 310 and the second expansion valve 320 may have an expansion flow path having an orifice to expand the refrigerant flowing from the condenser 200 toward the first chiller 410 and the second chiller 420, and may include a flow rate control adjustment means that adjusts the degree of opening of the orifice so that a flow rate of the refrigerant flowing from the condenser 200 toward the first chiller 410 and the second chiller 420 may be adjusted.

The first chiller 410 and the second chiller 420 correspond to an evaporator, the first expansion valve 310 and the first chiller 410 form a set, and the second expansion valve 320 and the second chiller 420 form another set, so that the two sets may be configured in parallel on the refrigerant line. In addition, the first chiller 410 and the second chiller 420 cool the coolant through an endothermic action by latent heat of evaporation of the refrigerant by evaporating the liquid refrigerant by heat-exchanging the low-pressure liquid refrigerant throttled by the first expansion valve 310 and the second expansion valve 320 with the coolant, respectively, and the low-temperature and low-pressure gaseous refrigerant evaporated from the first chiller 410 and the second chiller 420 is sucked and compressed again through the compressor 100 to be made into a high-temperature and high-pressure gaseous refrigerant, and then transferred to the condenser 200, so that a cycle in which the refrigerant is circulated as described above is repeated.

The first coolant circulation loop L2-1 may include the first chiller 410, a first coolant pump 510, and a first cooler 610. In addition, in the first coolant circulation loop L2-1, the first chiller 410, the first coolant pump 510, and the first cooler 610 may be connected by a coolant line.

Here, the first chiller 410 is a heat exchanger in which heat exchange between the refrigerant circulating in the refrigerant circulation loop L1 and the coolant circulating in the first coolant circulation loop L2-1 is performed.

The first coolant pump 510 is a means for pumping the coolant so that the coolant is circulated along the first coolant circulation loop L2-1.

The first cooler 610 serves to cool air by heat-exchanging the coolant cooled through the first chiller 410 with the air. At this time, the coolant cooled through the first chiller 410 may be supplied to the first cooler 610 by an operation of the first coolant pump 510. In addition, the first cooler 610 may be installed in an air conditioning case 640 of a vehicle air conditioner including a blower 630, and the air discharged from the blower 630 passes through the first cooler 610 along a space inside the air conditioning case 640 and is heat-exchanged with the coolant passing through the inside of the first cooler 610 to cool the air. In addition, the coolant discharged from the first cooler 610 is transferred to the first chiller 410 again, and a process in which the coolant is circulated as described above is repeated.

The second coolant circulation loop L2-2 may include the second chiller 420, a second coolant pump 520, and a second cooler 620. In addition, in the first coolant circulation loop L2-2, the second chiller 420, the second coolant pump 520, and the second cooler 620 may be connected by the coolant line. In addition, the second coolant circulation loop L2-2 is configured separately from the first coolant circulation loop L2-1, so that the second coolant circulation loop L2-2 and the first coolant circulation loop L2-1 may be formed so as not to be connected to each other.

Here, the second chiller 420 is a heat exchanger in which heat exchange between the refrigerant circulating in the refrigerant circulation loop L1 and the coolant circulating in the second coolant circulation loop L2-2 is performed.

The second coolant pump 520 is a means for pumping the coolant so that the coolant is circulated along the second coolant circulation loop L2-2.

The second cooler 620 serves to cool air by heat-exchanging the coolant cooled through the second chiller 420 with the air. At this time, the coolant cooled through the second chiller 420 may be supplied to the second cooler 620 by an operation of the second coolant pump 520. In addition, the second cooler 620 may be installed in the air conditioning case 640 of the vehicle air conditioner including the blower 630, and the air may be cooled by being heat-exchanged with the coolant passing through the inside of the second cooler 620. In addition, the coolant discharged from the second cooler 620 is transferred to the second chiller 420 again, and a process in which the coolant is circulated as described above is repeated.

At this time, the second cooler 620 may be disposed at the rear of the first cooler 610 in a flow direction of air in the air conditioning case 640. That is, the air discharged from the blower 630 may be firstly cooled while passing through the first cooler 610 along the space inside the air conditioning case 640, and then cooled secondarily while passing through the second cooler 620, and then supplied to the interior of the vehicle to be used for cooling the interior of the vehicle.

As a result, the heat exchange system for a vehicle according to the present invention may further lower a temperature of the air supplied to the interior of the vehicle, by using the coolant cooled by being heat-exchanged with the refrigerant in the cooling mode and using the first cooling circulation loop including the first cooler that cools the air by using the coolant heat-exchanged through the first chiller and the second coolant circulation loop including the second cooler that cools the air by using the refrigerant heat-exchanged through the second chiller, and accordingly, the cooling performance may be improved compared to the conventional technology of cooling the interior of the vehicle by using a secondary loop cooling system having one refrigerant circulation loop and one coolant circulation loop.

In addition, in the heat exchange system for a vehicle according to the present invention, in the cooling mode, the first expansion valve 310 and the second expansion valve 320 may be adjusted so that the refrigerant passing through the first chiller 410 has a higher pressure and temperature and has a higher flow rate than the refrigerant passing through the second chiller 420.

That is, in the cooling mode, the refrigerant flows through both the first chiller 410 and the second chiller 420, and the degree of opening of the first expansion valve 310 and the second expansion valve 320 is adjusted, so that the refrigerant with the higher flow rate flows through the first chiller 410 than the second chiller 420, and the pressure and temperature of the refrigerant flowing through the first chiller 410 are higher than the pressure and temperature of the refrigerant flowing through the second chiller 410.

As a result, the air may be cooled so that the temperature thereof is even lower by firstly cooling the air introduced from the first cooler 610 with a relatively large amount of coolant flow rate, and secondly cooling the air by the second cooler 620 with the coolant cooled to a relatively low temperature.

Accordingly, the temperature of air supplied to the interior of the vehicle may be further lowered, thereby improving the cooling performance.

In addition, the heat exchange system for a vehicle according to the present invention may further include a third coolant circulation loop L2-3. The third coolant circulation loop L2-3 may include a radiator 110, a third coolant pump 530, and the condenser 200, and the radiator 110, the third coolant pump 530, and the condenser 200 may be connected by the coolant line.

Here, the radiator 110 is a heat exchanger for cooling the coolant, and the third coolant pump 530 is a means for pumping the coolant so that the coolant is circulated along the third coolant circulation loop L2-3. As a result, the refrigerant may be cooled in the condenser 200 by the coolant flowing along the third coolant circulation loop L2-3, the coolant heated by being heat-exchanged in the condenser 200 may be cooled by outside air or the like through the radiator 110, and the coolant cooled by the radiator 110 is transferred to the condenser 200 again, so that the process in which the coolant is circulated as described above is repeated.

At this time, the third coolant circulation loop L2-3 is configured separately from the first coolant circulation loop L2-1, so that the third coolant circulation loop L2-3 and the first coolant circulation loop L2-1 may be formed so as not to be connected to each other.

In addition, the third coolant circulation loop L2-3 may be connected to the second coolant circulation loop L2-2 through a first four-way valve 711 and a second four-way valve 712, as illustrated, a lower coolant line to which the condenser 200 and the radiator 110 are connected in the third coolant circulation loop L2-3 and a lower coolant line to which the second chiller 420 and the second cooler 620 are connected in the second coolant circulation loop L2-2 may be connected by the first four-way valve 711, and an upper coolant line to which the condenser 200 and the radiator 110 are connected in the third coolant circulation loop L2-3 and an upper coolant line to which the second chiller 420 and the second cooler 620 are connected in the second coolant circulation loop L2-2 may be connected by the second four-way valve 712. Here, the first four-way valve 711 and the second four-way valve 712 may have four coolant lines connected thereto, and may be four-way direction switching valves capable of adjusting a state in which the four coolant lines are connected to or disconnected from each other.

As a result, as illustrated in FIG. 2, in the cooling mode, the first four-way valve 711 and the second four-way valve 712 are adjusted to block a flow of coolant between the third coolant circulation loop L2-3 and the second coolant circulation loop L2-2, and accordingly, the coolant may be circulated in the third coolant circulation loop L2-3 and the second coolant circulation loop L2-2, respectively.

Figure 3:
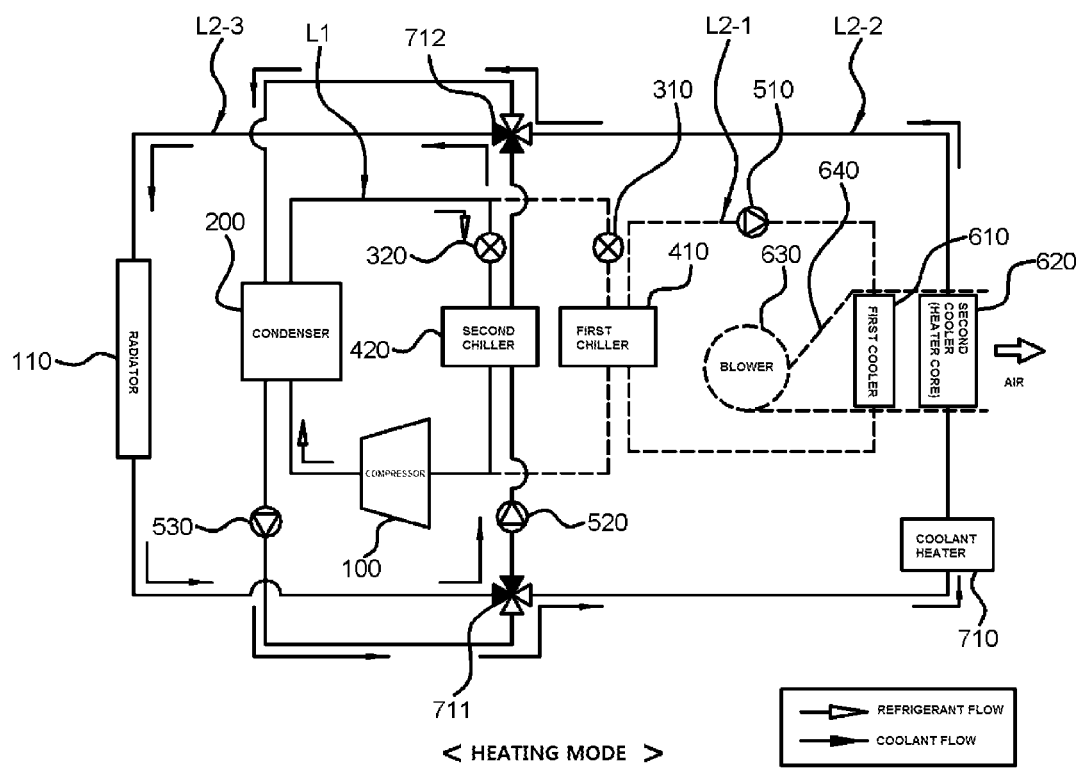
FIG. 3 is a configuration diagram illustrating a heating mode of the heat exchange system for a vehicle according to the first embodiment of the present invention.

In addition, as illustrated in FIG. 3, in the heating mode, the first four-way valve 711 and the second four-way valve 712 may be adjusted to form a flow of coolant circulating through the condenser 200 and the second cooler 620 and a flow of coolant circulating through the radiator 110 and the second chiller 420, respectively. Accordingly, the coolant that has absorbed heat from the outside air through the radiator 110 is heat-exchanged with the refrigerant in the second chiller 320 to heat the refrigerant, the refrigerant heated while passing through the compressor 100 is then heat-exchanged with the coolant through the condenser 200 to heat the coolant, the heated coolant is heat-exchanged with the air through the second chiller 620, so that the air is heated and is then supplied to the interior of the vehicle and may be used for heating the interior of the vehicle. Here, since the second cooler 620 serves as a heater in the heating mode, a heater core provided in the air conditioner of the vehicle may be used as the second cooler 620. In addition, since the first expansion valve 310 is closed, the refrigerant may not flow through the first chiller 410, and the first coolant pump 510 of the first coolant circulation loop L2-1 is in a stopped state so that the coolant may not be circulated along the first coolant circulation loop L2-1 and stopped.

In addition, in the heating mode, since energy required to heat the interior of the vehicle may be insufficient only by absorbing heat through the radiator 110 and absorbing heat by the operation of the compressor 100, a coolant heater 710 is installed at a position close to the second cooler 620 between the first four-way valve 711 and the second cooler 620 in the coolant line of the second coolant circulation loop L2-2 to allow the coolant heated while passing through the coolant heater 710 to flow directly into the second cooler 620, thereby making it possible to improve heating performance.

Second Embodiment

Figure 4:
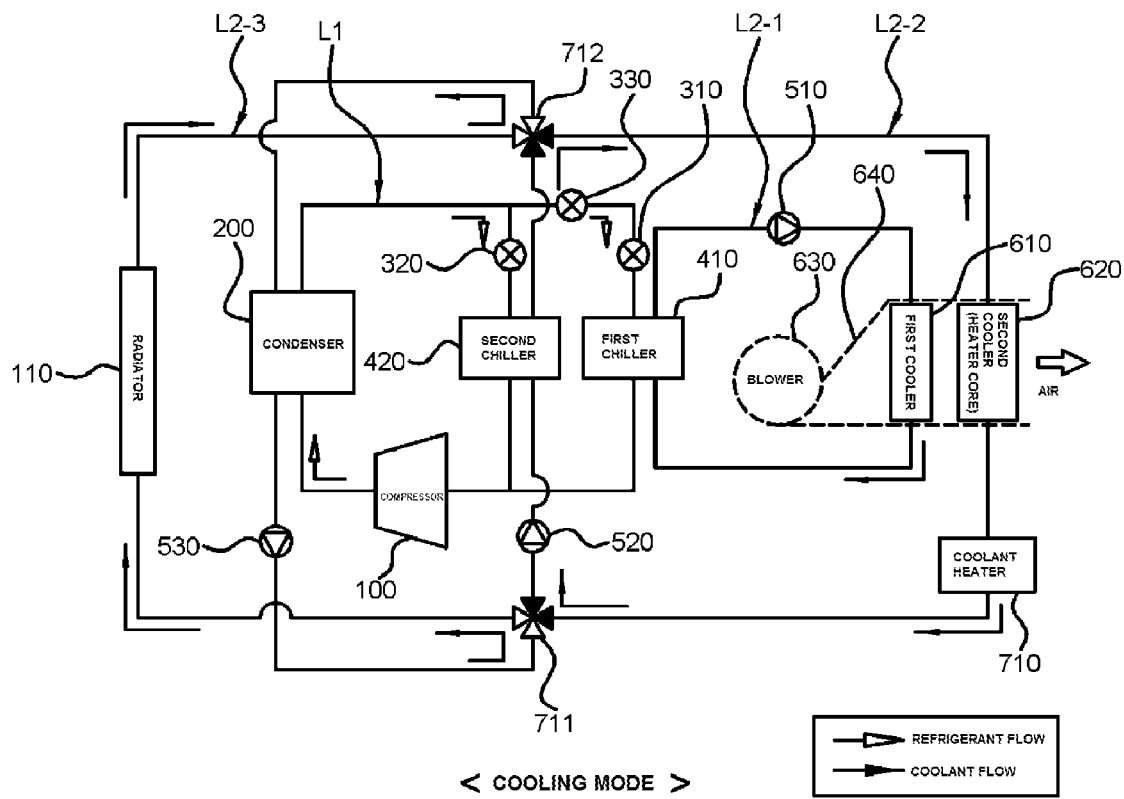
FIG. 4 is a configuration diagram illustrating a cooling mode of a heat exchange system for a vehicle according to a second embodiment of the present invention.

FIG. 4 is a configuration diagram illustrating a cooling mode of a heat exchange system for a vehicle according to a second embodiment of the present invention.

As illustrated, a heat exchange system for a vehicle according to a second embodiment of the present invention may include a third expansion valve 330 in addition to the configuration according to the first embodiment. At this time, the third expansion valve 330 is installed on the refrigerant line of the refrigerant circulation loop L1 and may be installed in front of the first expansion valve 310 in the flow direction of the refrigerant on the refrigerant line flowing toward the first expansion valve 310 after the refrigerant discharged from the condenser 200 is branched.

As a result, in the cooling mode, a flow rate of the refrigerant flowing toward the first expansion valve 310 and the second expansion valve 320 may be distributed and controlled by the third expansion valve 330, and as a result, a pressure difference between the refrigerant formed in the first chiller 410 and the second chiller 420 may be further increased, thereby further improving the cooling performance. At this time, the first expansion valve 310 and the second expansion valve 320 may be adjusted in the same manner as in the first embodiment.

Figure 5:
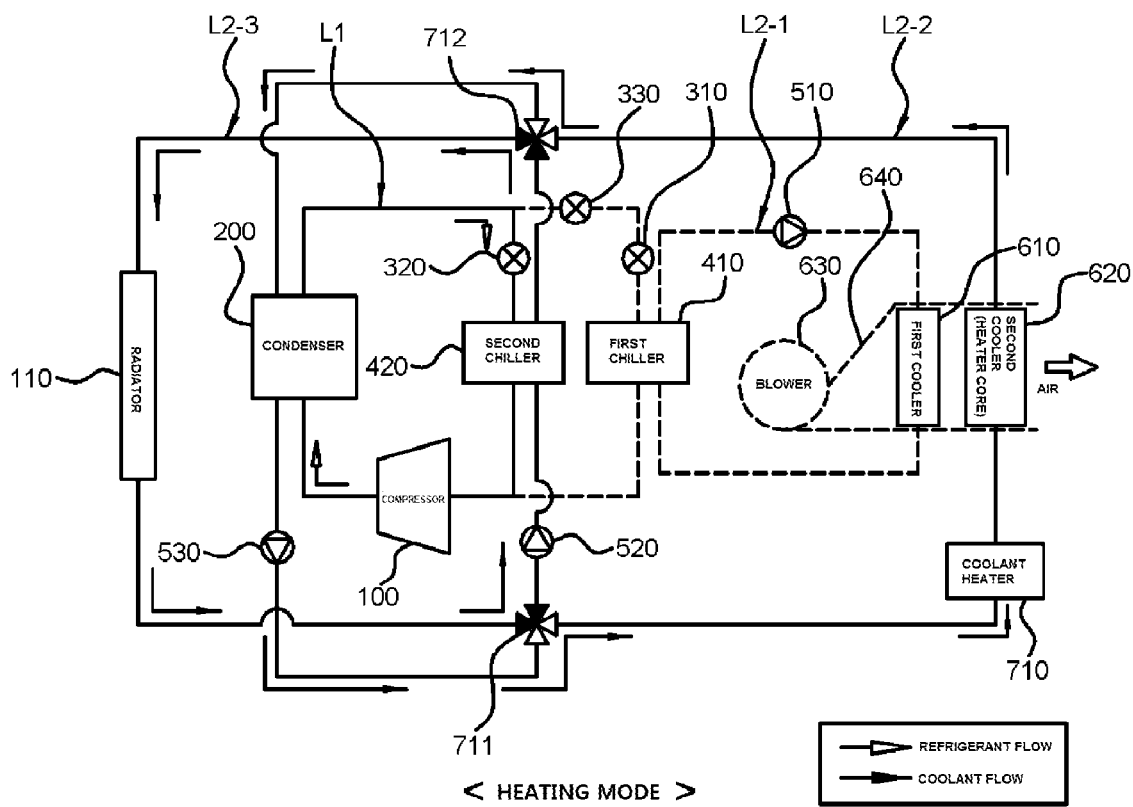
FIG. 5 is a configuration diagram illustrating a heating mode of the heat exchange system for a vehicle according to the second embodiment of the present invention.

In addition, as illustrated in FIG. 5, the heat exchange system for a vehicle according to the second embodiment of the present invention can be operated and controlled in the same manner as the heating mode of the first embodiment in the heating mode, and since the third expansion valve 330 is closed, the refrigerant may not flow through the first expansion valve 310 and the first chiller 410.

Third Embodiment

Figure 6:
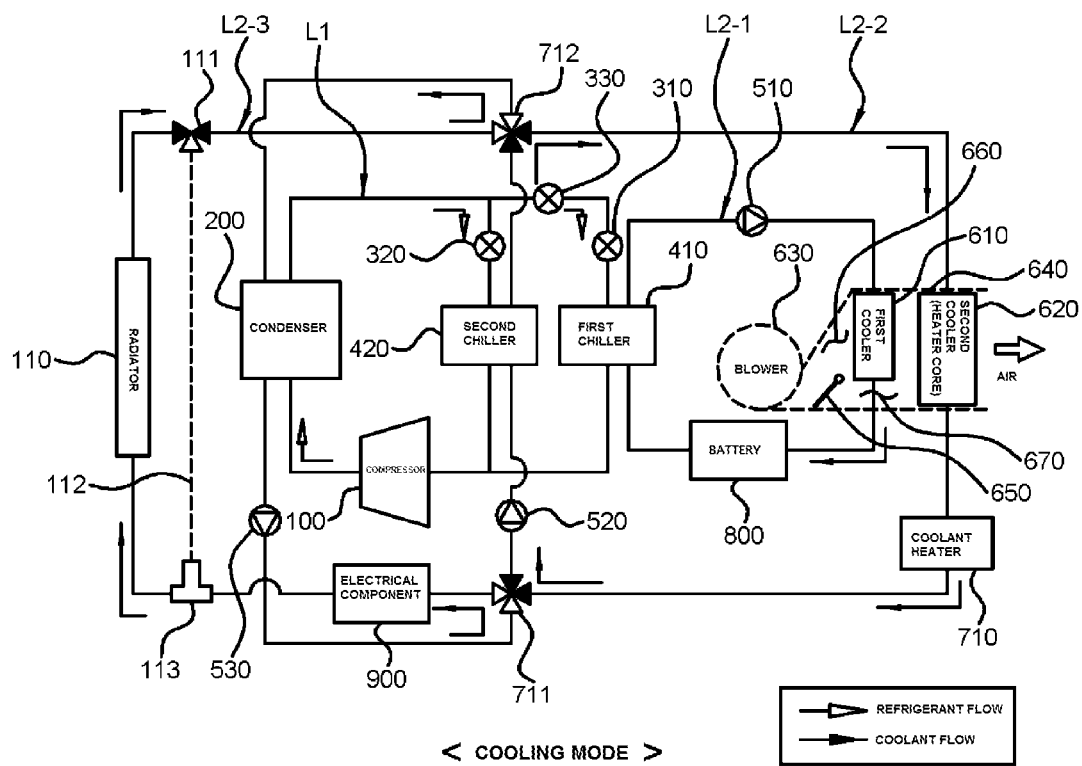
FIG. 6 is a configuration diagram illustrating a cooling mode of a heat exchange system for a vehicle according to a third embodiment of the present invention.

FIG. 6 is a configuration diagram illustrating a cooling mode of a heat exchange system for a vehicle according to a third embodiment of the present invention.

As illustrated, a heat exchange system for a vehicle according to a third embodiment of the present invention may include a battery 800 and an electrical component 900 in addition to the configuration according to the first embodiment. At this time, the battery 800 may be a battery pack for driving a motor of the vehicle, and the battery 800 may be installed on the coolant line of the first coolant circulation loop L2-1 and cooled by the coolant. In addition, the battery 800 is installed on the coolant line in front of the first chiller 410 and in the rear of the first cooler 610 in the flow direction of the coolant, and may be configured so that the coolant after passing through the first cooler 610 cools the battery 800 in the cooling mode.

In addition, the electrical component 900 may be installed on the coolant line of the third coolant circulation loop L2-3 and cooled by the coolant. At this time, the electrical component 900 may be a motor, an inverter, an On Board Charger (OBC), and the like, and the electrical component 900 may be installed on the coolant line of the third coolant circulation loop L2-3 and cooled by the coolant. In addition, the electrical component 900 is installed on the coolant line in the rear of the first four-way valve 711 and in front of the radiator 110 in the flow direction of the coolant, and may be configured so that the coolant after passing through the condenser 200 cools the electrical component 900 in the cooling mode.

In addition, the first cooler 610, the second cooler 620, and a temperature control door 650 may be provided inside the air conditioning case 640 of the vehicle air conditioner, and the temperature control door 650, the first cooler 610, and the second cooler 620 may be sequentially disposed from the front to the rear in the flow direction of air supplied into the air conditioning case 640 from the blower 630 installed on one side of the air conditioning case 640. At this time, the temperature control door 650 may be configured to selectively open and close a cooling flow path 660 and a heating flow path 670 inside the air conditioning case 640 or control a flow rate of air passing through the cooling flow path 660 and the heating flow path 670. The first cooler 610 may be disposed on the side of the cooling flow path 660 so as not to block the heating flow path 670 in proximity to the temperature control door 650, and the second cooler 620 may be disposed on an opened rear end portion of the air conditioning case 640 and may be formed to correspond to the entire area inside the rear end portion.

As a result, in the cooling mode, the temperature control door 650 is adjusted to block the heating flow path 670 side, so that the air blown by the blower 630 is cooled firstly while passing through the first cooler 610, then passes through the second cooler 620 and is further cooled secondarily, and then supplied to the interior of the vehicle to be used for cooling. At this time, the flow of the refrigerant and coolant may be the same as in the first embodiment or the second embodiment.

Figure 7:
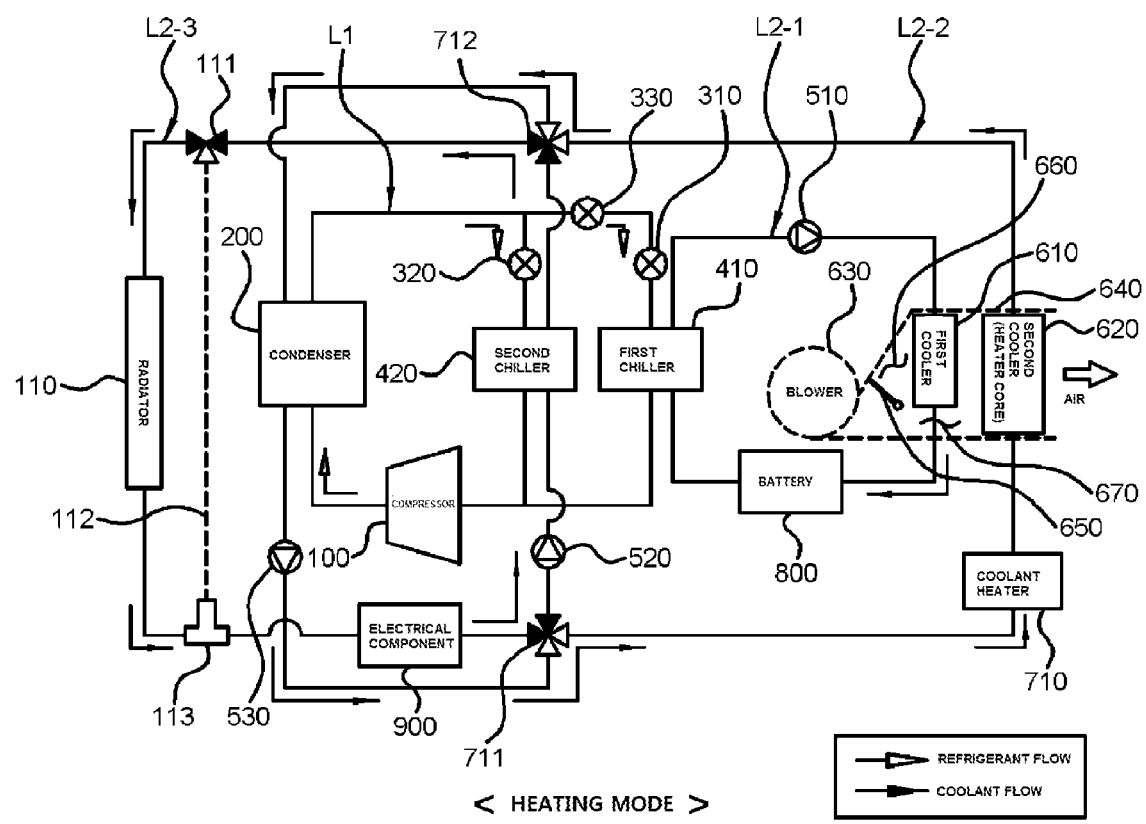
FIGS. 7 and 8 are configuration diagrams illustrating a heating mode of the heat exchange system for a vehicle according to the third embodiment of the present invention.

In addition, as illustrated in FIG. 7, in the heating mode, the temperature control door 650 is adjusted to block the cooling flow path 660 side, so that the air blown by the blower 630 is heated by being heat-exchanged with warm coolant while passing through only the second cooler 620 without passing through the first cooler 610, and is then supplied to the interior of the vehicle to be used for heating. At this time, the flow of the refrigerant and coolant is the same as in the first embodiment or the second embodiment, and additionally, in the refrigerant circulation loop L1, the refrigerant also flows through the first expansion valve 310 and the first chiller 410, and the coolant is circulated along the first coolant circulation loop L2-1, so that waste heat of the battery 800 and the electrical component 900 may be recovered through the coolant and used for heating the interior of the vehicle.

In addition, in the heat exchange system for a vehicle according to the third embodiment of the present invention, as in the second embodiment, the third expansion valve 330 is installed, and the flow rate of the refrigerant flowing toward the first expansion valve 310 and the second expansion valve 320 may be distributed and controlled by the third expansion valve 330.

In addition, the heat exchange system for a vehicle according to the third embodiment may further include a bypass line 112 installed on the coolant line of the third coolant circulation loop L2-3, disposed in parallel with the radiator 110, and capable of adjusting the flow rate of the coolant passing through the radiator 110.

As an example, a three-way valve 111 is installed on the coolant line connecting the second four-way valve 712 and the radiator 110 and a joint portion 113 is formed on the coolant line connecting the electrical component 900 and the radiator 110, so that the bypass line 112 may be formed to connect the three-way valve 111 and the joint portion 113. At this time, the three-way valve 111 may have three coolant lines connected thereto and may be a three-way direction switching valve capable of adjusting a state in which the three coolant lines are connected to or disconnected from each other. In addition, the joint portion 113 may be a pipe joint in which all three coolant lines are connected to allow the coolant to flow.

Figure 8:
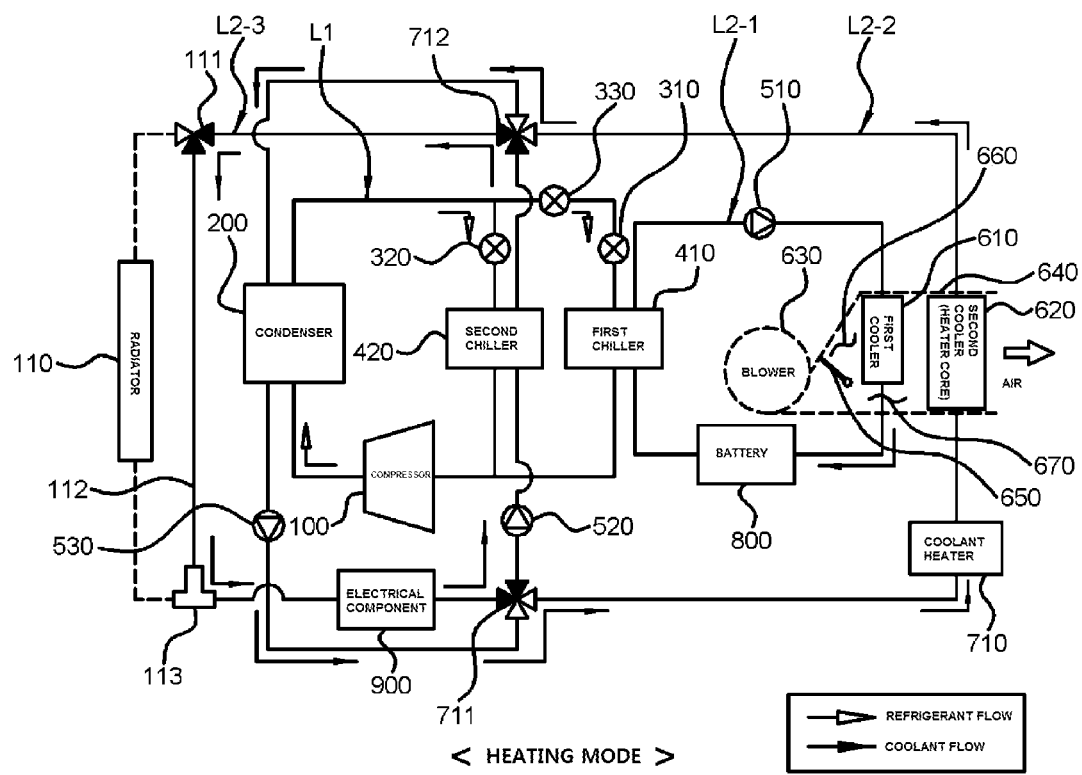

As a result, in the heating mode, by adjusting the three-way valve 111 according to a temperature of outside air, as illustrated in FIG. 7, the flow of coolant to the bypass line 112 is blocked, and the coolant is heat-exchanged while passing through the radiator 110, or conversely, as illustrated in FIG. 8, the flow of coolant to the radiator 110 is blocked and the coolant may pass through the bypass line 112.

The present invention is not limited to the above-described embodiments, and may be variously applied. In addition, the present invention may be variously modified by those skilled in the art to which the present invention pertains without departing from the spirit of the present invention claimed in the claims.

DESCRIPTION OF REFERENCE NUMERALS

100: compressor
110: radiator
111: three-way valve
112: bypass line
113: joint portion
200: condenser
310: first expansion valve
320: second expansion valve
330: third expansion valve
410: first chiller
420: second chiller
510: first coolant pump
520: second coolant pump
530: third coolant pump
610: first cooler
620: second cooler (heater core)
630: blower
640: air conditioning case
650: temperature control door
660: cooling flow path
670: heating flow path
710: coolant heater
711: first four-way valve
711: first four-way valve
712: second four-way valve
800: battery
900: electrical component
L1: refrigerant circulation loop
L2-1: first coolant circulation loop
L2-2: second coolant circulation loop
L2-3: third coolant circulation loop

The invention claimed is:

1. A heat exchange system for a vehicle, the heat exchanging system comprising:
    a refrigerant circulation loop including a compressor, a condenser, a first expansion valve, a second expansion valve, a first chiller, and a second chiller and having a refrigerant circulating therethrough, wherein the first expansion valve and the first chiller form a set and the second expansion valve and the second chiller form another set so that the two sets are disposed in parallel;
    a first coolant circulation loop including a first cooler and circulating a coolant heat-exchanged with the refrigerant through the first chiller; and
    a second coolant circulation loop including a second cooler and circulating a coolant heat-exchanged with the refrigerant through the second chiller, and
    a third coolant circulation loop including a radiator and circulating a coolant heat-exchanged with the refrigerant through the condenser.

2. The heat exchange system for a vehicle of claim 1, wherein in a cooling mode, the first expansion valve and the second expansion valve are adjusted so that the refrigerant passing through the first chiller has a higher pressure and temperature and has a higher flow rate than the refrigerant passing through the second chiller.

3. The heat exchange system for a vehicle of claim 2, wherein air cooled firstly through the first cooler is secondarily cooled through the second cooler and then used to cool the interior of the vehicle.

4. The heat exchange system for a vehicle of claim 1, wherein the third coolant circulation loop is connected to the second coolant circulation loop by a first four-way valve and a second four-way valve,
- in a cooling mode, a flow of coolant between the third coolant circulation loop and the second coolant circulation loop is blocked, and
- in a heating mode, the first four-way valve and the second four-way valve are adjusted so that a flow of coolant circulating the condenser and the second cooler and a flow of coolant circulating the radiator and the second chiller are formed, respectively.

5. The heat exchange system for a vehicle of claim 4, further comprising a coolant heater installed on a coolant line of the second coolant circulation loop to heat the coolant.

6. The heat exchange system for a vehicle of claim 4, further comprising a battery installed on a coolant line of the first coolant circulation loop and an electrical component installed on a coolant line of the third coolant circulation loop,
- wherein in the cooling mode, the battery and the electrical component are cooled through the coolant, and in the heating mode, waste heat of the battery and the electrical component is recovered through the coolant and used for heating the interior of the vehicle.

7. The heat exchange system for a vehicle of claim 6, wherein in the cooling mode, air cooled firstly through the first cooler is secondarily cooled through the second cooler and then used for cooling the interior of the vehicle, and
- in the heating mode, the air is heated through only the second cooler without passing through the first cooler, and then used for heating the interior of the vehicle.

8. The heat exchange system for a vehicle of claim 6, further comprising a bypass line installed on the coolant line of the third coolant circulation loop, disposed in parallel with the radiator, and adjusting a flow rate of the coolant passing through the radiator.

9. The heat exchange system for a vehicle of claim 4, further comprising a third coolant pump installed on a coolant line of the third coolant circulation loop to circulate the coolant.

10. The heat exchange system for a vehicle of claim 1, further comprising a third expansion valve installed on a refrigerant line of the refrigerant circulation loop to distribute and adjust a flow rate of the refrigerant flowing toward the first expansion valve and the second expansion valve.

11. The heat exchange system for a vehicle of claim 1, further comprising a battery installed on a coolant line of the first coolant circulation loop and cooled by the coolant.

12. The heat exchange system for a vehicle of claim 1, further comprising a first coolant pump installed on a coolant line of the first coolant circulation loop to circulate the coolant and a second coolant pump installed on a coolant line of the second coolant circulation loop to circulate the coolant.

13. A heat exchange system for a vehicle, the heat exchanging system comprising:
- a refrigerant circulation loop including a compressor, a condenser, a first expansion valve, a second expansion valve, a first chiller, and a second chiller and having a refrigerant circulating therethrough, wherein the first expansion valve and the first chiller form a set and the second expansion valve and the second chiller form another set so that the two sets are disposed in parallel;
- a first coolant circulation loop including a first cooler and circulating a coolant heat-exchanged with the refrigerant through the first chiller;
- a second coolant circulation loop including a second cooler and circulating a coolant heat-exchanged with the refrigerant through the second chiller, and
- a third expansion valve installed on a refrigerant line of the refrigerant circulation loop to distribute and adjust a flow rate of the refrigerant flowing toward the first expansion valve and the second expansion valve.

\* \* \* \* \*